(12) United States Patent
Rexius

(10) Patent No.: US 6,357,971 B1
(45) Date of Patent: Mar. 19, 2002

(54) MOBILE BLOWER SYSTEM FOR DEPOSITING GRASS SEED AND ORGANIC MATERIAL

(75) Inventor: Arlen L. Rexius, Eugene, OR (US)

(73) Assignee: Rexius Forest By-Products, Inc., Eugene, OR (US)

( * ) Notice: Subject to any disclaimer, the term of this patent is extended or adjusted under 35 U.S.C. 154(b) by 19 days.

(21) Appl. No.: 09/596,743

(22) Filed: Jun. 19, 2000

(51) Int. Cl.$^7$ .................................................. B60P 1/60
(52) U.S. Cl. ............................. 406/43; 406/48; 406/45
(58) Field of Search .............................. 40/39, 43, 46, 40/47, 48, 49, 86, 198

(56) References Cited

U.S. PATENT DOCUMENTS

| | | | |
|---|---|---|---|
| 4,219,966 A | 9/1980 | McCallster | 47/9 |
| 4,793,742 A | 12/1988 | Strand | 406/79 |
| 5,125,583 A | 6/1992 | Strand | 239/655 |
| 5,181,804 A | 1/1993 | Wyson et al. | 406/56 |
| 5,361,711 A | 11/1994 | Beyerl | 111/127 |
| 5,556,237 A | 9/1996 | Rexius | 406/32 |
| 6,036,406 A | * 3/2000 | Rexius | 406/39 |

* cited by examiner

Primary Examiner—Christopher P. Ellis
Assistant Examiner—Joe Dillon, Jr.
(74) Attorney, Agent, or Firm—James D. Givnan, Jr.

(57) ABSTRACT

A truck is equipped with a bin from which bin contents are fed into a blower pressurized conduit by a feed screw conveyor immediately prior to entry into a flexible discharge conduit. Control means permit feed screw conveyor speed to be varied to control the rate of seed discharge into the pressurized conduit. Provision is made for a tank and nozzle for injecting water and/or fertilizer into the pressurized conduit. The truck includes a moving floor conveyor for transferring organic material toward vertical augers which break up the material and feed the material to a powered mixer prior to entry into a rotary feeder and the pressurized air flow. The mixing of seed with the organic material and/or water or fertilizer immediately prior to the composite flow of material entering a flexible discharge conduit mitigates damage to the seed.

2 Claims, 1 Drawing Sheet

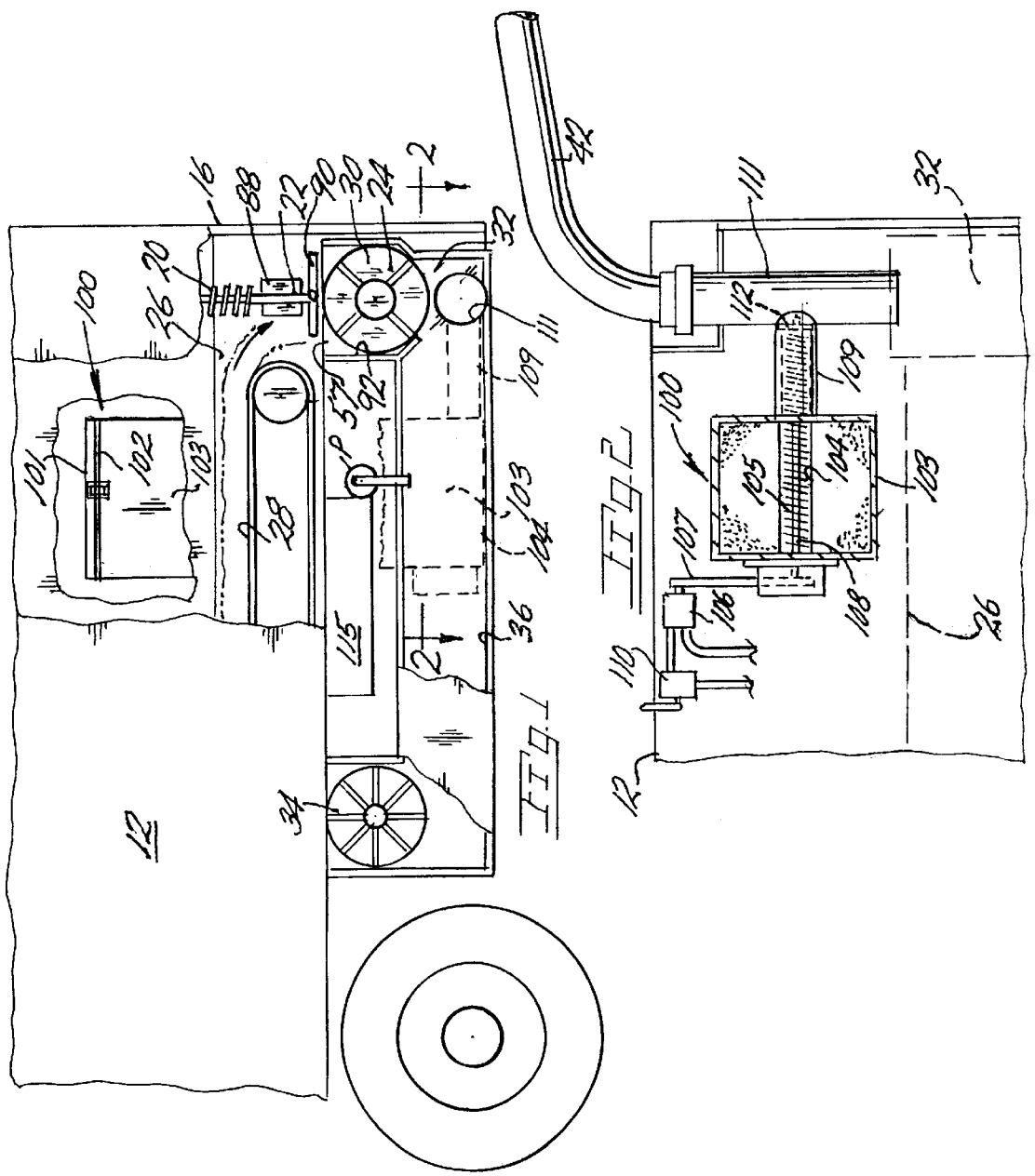

MOBILE BLOWER SYSTEM FOR DEPOSITING GRASS SEED AND ORGANIC MATERIAL

BACKGROUND OF THE INVENTION

The present system concerns equipment for the delivery of mixed seed and organic matter to a ground surface.

In recent years it has been determined that it is highly practical to seed large areas located along roadways by the broadcasting of seed and organic material from a vehicle.

U.S. Pat. No. 5,556,237 issued to the present inventor discloses a system for accomplishing the delivery of organic material from a truck trailer to a ground surface with no provision for delivery of seeds.

U.S. Pat. Nos. 4,793,742 and 5,125,583 show a truck equipped with multiple boom assemblies through which pressurized air from a blower is directed. Each boom is served by a separate mixing chamber in which particulate material gravitates from a conveyor into an air flow for each boom. No provision is made for the subsequent addition of material to the air flow passing through each boom.

U.S. Pat. No. 5,361,711 discloses a truck equipped with a tank containing an aqueous mixture of seed and soil conditioning materials. Additionally carried by the truck is a blower assembly into which may be fed dry material such as straw or hay which is subjected to a blower for discharge onto a ground surface by a directional discharge spout. The blower assembly functions separately from those components mixing and discharging the aqueous mixture.

U.S. Pat. No. 4,219,966 discloses a method of treating grass seed with a fertilizer and an adhesive which is then fed via an auger for mixing same with cellulose. A blower at a work site is utilized for spreading the mixed seed, fertilizer, adhesive and cellulose mixture. Water may be added prior to blower discharge of the mixture.

U.S. Pat. No. 5,181,804 is of interest in that a conveyor has right and left hand flights to feed material toward a central discharge outlet in communication with a rotary air valve having knife components and rotary vanes. An inlet directs pressurized air between successive pairs of vanes to discharge material confined between said vanes in an axial direction into an outlet.

SUMMARY OF THE PRESENT INVENTION

The present invention concerns the provision of a feeder mechanism discharging seed into an airflow in a conduit in which organic matter has previously been deposited.

The feeder mechanism includes conveyor means, shown as an auger, which receives seed from a bin or other storage receptacle on a mobile base. The seed enters the airflow subsequent to the addition of organic material earlier added in a mixing chamber with the seed accordingly avoiding damage from the earlier mixing action. The airflow may also carry growth enhancing matter.

A suitable conveyor for the seed is an auger or screw conveyor which receives the seed from a bin on the mobile base. As the conduit is pressurized the seed conveyor and bin, or other receptacle, will be pressurized to avoid interference with the flow of seed into the discharge conduit.

The present feed mechanism permits the planting of grass seed using a blower with the simultaneous application of growth enhancing matter to a small site, such as a residential lot, or over a large area, without undesirable passage of a truck or other vehicle over the ground surface.

Important objectives of the present invention include the provision of a seed bin for grass seed and/or grass growing material for conveyance into a pressurized air flow containing organic material on a mobile base for the planting of-seed and growth supporting material in a single application and through a lightweight flexible hose. Damage to the conveyed material, e.g., grass seed, is mitigated by addition into the pressurized air flow subsequent to the addition of the organic material.

BRIEF DESCRIPTION OF THE DRAWINGS

In the drawings:

FIG. 1 is a partial side elevational view of a truck trailer with fragments broken away for purposes of illustration.

FIG. 2 is a horizontal sectional view taken along line 2—2 of FIG. 1.

DETAILED DESCRIPTION OF THE PREFERRED EMBODIMENTS

U.S. Pat. Nos. 5,556,237 and 6,036,406 issued to the present inventor are incorporated herein by reference.

With continuing attention to the drawing, applied reference numerals indicate parts similarly hereinafter identified. Briefly, U.S. Pat. No. 5,556,237 discloses a container truck including a trailer 12 which may be open at its top to receive a load of loose particulate such as, for example, wood by-products and compost. A trailer rear door is at 16. Floor structure of the trailer includes inclined floor sides as at 26 with both terminating downwardly adjacent opposite sides of a central moving floor 28 which conveys the organic material rearwardly toward door 16 and a pair of inwardly directed augers as at 20 carried by the door each serving to break up and feed loose particulate toward a centrally located mixer 22 adjacent the discharge end of the moving floor. Mixer 22 includes a centrally disposed, powered shaft, also journalled on door 16 and fitted with paddles 88 and radially extending rods 90 to break up any particulate that may otherwise tend to bridge over an outlet opening 57 in the trailer floor. Below opening 57 is a rotary feeder 24 housed within upright ducting 92. Radially extending walls on feeder 24 define chambers 30 which, during powered rotation of the feeder, receive amounts of loose particulate which is discharged downwardly into a mixing chamber 32. The radial length of the feeder walls provide outer edges which cooperate with the inner surfaces of ducting 36 originating at a blower 34. A hose 42 or flexible conduit receives pressurized air from blower 34 along with the loose particulate discharged from feeder 24 as disclosed in the earlier noted patents incorporated herein by reference.

A liquid transporting tank 115 is carried by trailer 12 with a pump P driven as by a hydraulic motor (not shown) and serves to inject water into ducting 36 to inhibit particulate from becoming airborne when discharged from hose 42. Tank 115 may be utilized to transport and provide a source of other liquids including fertilizer and weed killer solutions.

A seed bin is indicated generally at 100, having a lid 101 in sealed contact with the bin by means of a gasket 102. The lower portion 103 of the bin defines a channel 104 into which seed gravitates. A feed screw 105 is journalled in a bin sidewall as well as being journalled in a spider 112 fixed in place within a housing 109. A motor 106, preferably hydraulic, is coupled by means of power transmission means 107 to a shaft 108 of the feed screw. A valve at 110 provides a flow control to regulate the speed of motor 106 and hence the rotational speed of feed screw shaft 108. Accordingly, the rate at which seed is transferred from bin 100 into a discharge conduit 111 for mixing with air and organic material moving therethrough is controlled with the resulting composite flow being delivered to flexible conduit or hose 42 for dispersal of the resulting material on a ground surface area.

In use, the container area of the trailer 12 is provided with the selected organic material, usually compost, to best suit the seeding task at hand. The rate of seed discharge by auger 104 is set to provide the amount of seed required for the flow of organic material from rotary feeder 24 controlled in a remote manner per the earlier two patents incorporated herein by reference.

While an auger is shown and described as one conveyor means for depositing material into outlet pipe 110, in some applications it may be practical to utilize other conveyor means including airlock feeders, for injecting the material into outlet pipe 110.

While I have shown but one embodiment of the invention, it will be apparent to those skilled in the art that the invention may be embodied still otherwise without departing from the spirit and scope of the claimed invention.

Having thus described the invention, what is desired to be secured by a Letters Patent is:

1. In a mobile apparatus in place on a vehicle for transporting and dispensing a mixture of seed and organic material onto a ground surface adjacent the vehicle and having a blower, a mixing chamber fed by the blower, a hopper for seed, a storage area for organic material, flexible conduit means in receiving communication with the mixing chamber, the improvement comprising, a discharge conduit in receiving communication with the mixing chamber and said flexible conduit means, and conveyor means for receiving and transferring hopper contents to the discharge conduit for mixing with blower discharge and organic material therein prior to delivery to said flexible conduit means.

2. The improvement claimed in claim 1 wherein said conveyor means is a feed screw having helical flights.

* * * * *